United States Patent [19]
Zhang

[11] Patent Number: 5,978,494
[45] Date of Patent: Nov. 2, 1999

[54] METHOD OF SELECTING THE BEST ENROLL IMAGE FOR PERSONAL IDENTIFICATION

[75] Inventor: Guang Hua Zhang, Maple Shade, N.J.

[73] Assignee: Sensar, Inc., Moorestown, N.J.

[21] Appl. No.: 09/034,593

[22] Filed: Mar. 4, 1998

[51] Int. Cl.[6] .................................................. G06K 9/00
[52] U.S. Cl. ............................................................ 382/117
[58] Field of Search ...................................... 382/115, 117, 382/118, 209, 156, 255, 205, 225; 340/825.3, 825.4

[56] References Cited

U.S. PATENT DOCUMENTS

| | | |
|---|---|---|
| 4,641,349 | 2/1987 | Flom et al. . |
| 5,291,560 | 3/1994 | Daugman . |
| 5,479,570 | 12/1995 | Imagawa et al. . |
| 5,534,923 | 7/1996 | Suda . |
| 5,537,488 | 7/1996 | Menon et al. . |
| 5,621,822 | 4/1997 | Yukawa et al. . |
| 5,659,812 | 8/1997 | Uchiyama . |
| 5,678,097 | 10/1997 | Suda . |
| 5,703,964 | 12/1997 | Menon et al. . |

*Primary Examiner*—Joseph Mancuso
*Assistant Examiner*—Vikkram Bali
*Attorney, Agent, or Firm*—Buchanan Ingersoll, P.C.

[57] ABSTRACT

A method is described for selecting an enrollment image or standard from multiple close-up images of a subject such as a human eye. The selected image is the one image that best represents the appearance of that subject to an image processing system which identifies subjects by comparison of later taken images of subject to the selected image.

19 Claims, 2 Drawing Sheets

METHOD OF SELECTING THE BEST ENROLL IMAGE FOR PERSONAL IDENTIFICATION

BACKGROUND OF THE INVENTION

1. Field of the Invention

The invention relates to selecting the best master enroll image used for identifying individuals from facial images, and more particularly from images of the eye. The master image may be used either in its original form or it may be used to compute a biometric code, such as an iris code which is stored and used for later comparisons.

2. Description of the Prior Art

There are several methods known as biometrics for recognizing or identifying an individual from personal biological characteristics. Some of these methods involve imaging of the face or eye and analyzing the facial features, retinal vascular patterns of the eye, or patterns in the iris of the eye. In recent years there has been a demand for more reliable systems to identify individuals, particularly those persons who desire access to a secured area or system. A common example of such a secured system is automated teller machines which allow authorized users to conduct banking transactions. Many of these systems are used by a wide variety of people. Very often these people demand quick as well as accurate identification.

A technique for accurately identifying individuals using iris recognition is described in U.S. Pat. No. 4,641,349 to Flom et al. and in U.S. Pat. No. 5,291,560 to Daugman. The systems described in these references require a clear and representative master enroll (template) image of the eye. The master enroll image is the image chosen to represent the unique characteristics of an individual, in this case, the characteristics of an individual's iris. The master enroll image is used as input to Daugman's algorithm to generate an iris code. The iris code extracted from the master enroll image is compared to a second iris code extracted from a current image of an individual whenever that individual's identity needs to be determined or verified. The present invention relates to selecting the best master enroll image to be used in such systems.

SUMMARY OF THE INVENTION

I provide a reliable, efficient and automatic method for selecting the best master enroll image from a set of close-up images of an eye. I compute focus measures for these images. I select those images having a degree of focus in a range representing the characteristics of the imaging system employed. Each of the above selected images is then verified against the remainder of the selected images. For each of these sets, the number of successful verifications and the median Hamming distances of the successful verifications are recorded. The master enroll image is chosen to be one associated with the set having the largest number of successful verifications. If there is more than one set meeting this qualification, the choice is reduced to one by choosing the master enroll image for the set having the lowest median Hamming distance of the successful verifications.

DETAILED DESCRIPTION OF THE PREFERRED EMBODIMENTS

Using an image processing system consisting of a computer system with standard video imaging facility, such as a CCD video camera and video frame grabber, I obtain multiple close-up images of an eye. Each image is formed by a set of pixels (picture elements) each having a gray scale value. I then process this set of images according to the method of the present invention.

Figure 1:
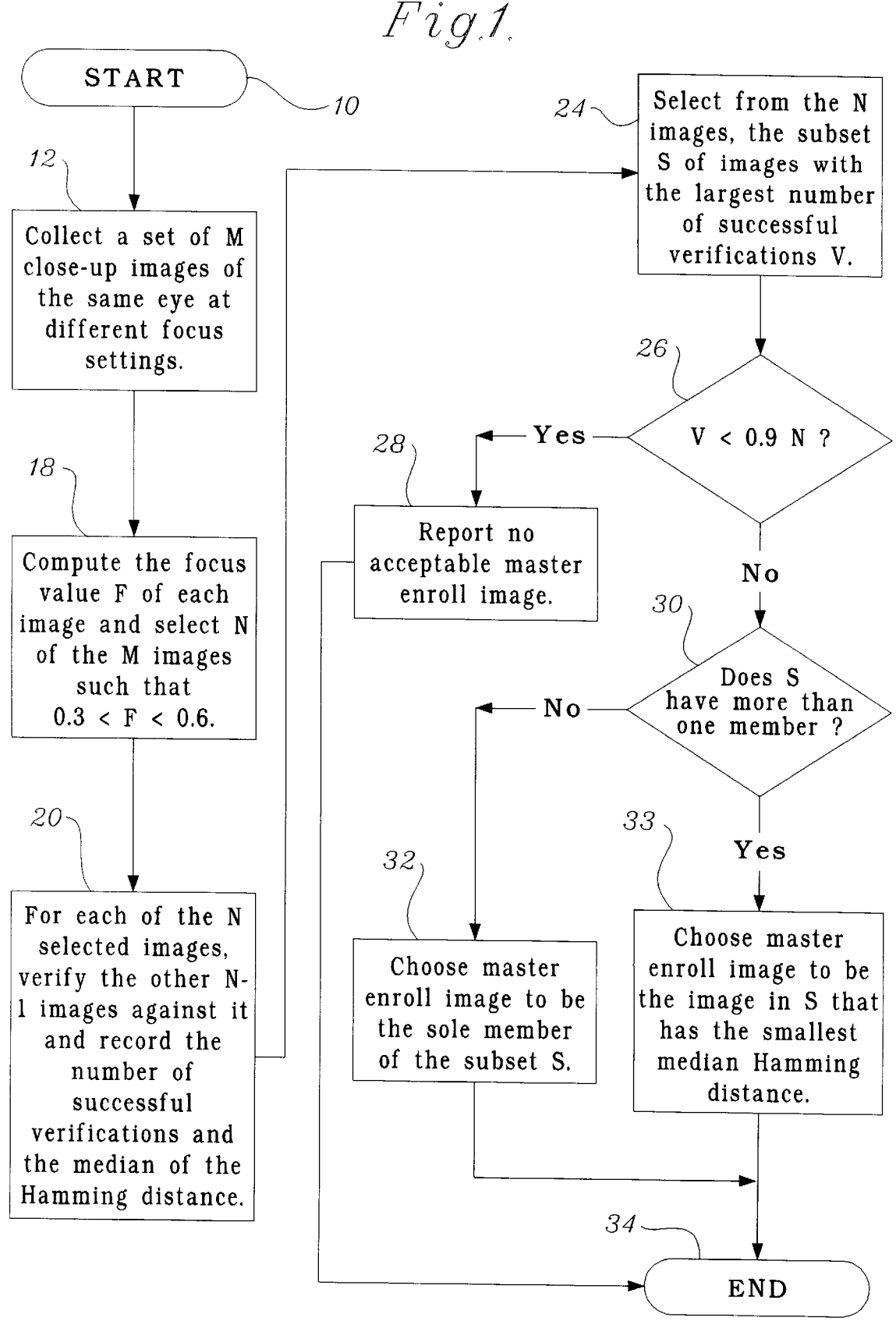
FIG. 1 is a flowchart of a preferred embodiment of my method for selecting a master enroll image.

I begin at step 10 in FIG. 1 with a subject present in front of the video imaging facility. At step 12, I collect a set of close-up images of one eye of the subject. Such images contain the full iris and pupil portions of the eye with a resolution of at least 130 pixels across the iris diameter. The images in the set differ in that each is taken with a different focus setting. The required number of images M and the range of focus settings depend on the statistics of performance of the specific video imaging facility. In the case of the Sensar . . . Secure™ Iris Identification System Model 765 R1, an empirical analysis of many eye images obtained with the system was used to determine that 20 to 30 images are sufficient to represent the range of focus variation during normal operation.

For the IrisIdent Model 765 system, focus was determined to be the most significant variation affecting the quality of eye images to be used for personal identification. However, other parameters that vary during system operation, such as amount and direction of illumination and distance of the subject from the system, also affect the image quality, and it may be necessary to include more images in the set collected in step 12 while varying these other parameters in specific ranges to represent the variation of these other parameters during normal operation.

At step 18 in FIG. 1, a focus measure of each of the M images is computed using the method previously described in U.S. patent application Ser. No. 08/982,364, filed Dec. 2, 1997 entitled "Method of Measuring the Focus of Close-Up Images of Eyes", which application is incorporated herein by reference. This method begins with an approximate location of the pupil/iris boundary in the image, then measures how sharply this boundary is focused. The measurement is done by computing the median pixel value in a portion of the pupil, and then doing the same for a portion of the iris. These medians are subtracted to get the step size at the pupil/iris boundary. Next the method computes the magnitude of gradients at the pupil/iris boundary and divides an average of the gradient magnitudes by the step size to get the multiplicative inverse of the width of the transition region at the pupil/iris boundary. This latter value is maximum when the focus is optimized. Using this method creates a focus measure computation for images that produces a value between 0 and 1, where 1 indicates an image that is 100% in focus. Statistics of the focus measures of more than 2000 eye images obtained from normal operation of Sensar's Model 765 system show that a focus measure from 0.30 to 0.60 define those images that produce good results in terms of minimizing hamming distances. Therefore, I select from the set of M images, only those $N \leq M$ images with focus measures from 0.30 to 0.60.

At step 20, each of the N images is verified against the remaining images, such as according to the method described in U.S. Pat. No. 5,291,560. I will call the image against which others are compared the "candidate master enroll image". For each of these sets of comparison, the number of the successful verifications and the median of the Hamming distances of the successful verifications are recorded.

At step 24, the image or images having the largest number of successful verifications are selected as subset S. If the largest number of successful verifications V is less than 90% of the number of selected images N (step 26), then no image is considered to be representative of the collection of N images and thus no master enroll image can be chosen (step 28). Otherwise, if the subset S has only one member (step 30), then this sole candidate master enroll image is chosen to be the master enroll image (step 32), but if the subset S has more than one member (step 30), then the master enroll image is chosen to be the candidate master enroll image in subset S that produces the smallest median Hamming distance for successful verifications (step 33). The process ends at step 34.

The 90% threshold at step 26 is derived empirically and it depends on the focus range chosen in step 18 which in turn depends on the performance of many elements of the image processing system and its associated hardware (camera, lens, frame grabber, etc.)

There may be occasions when it is impractical or disagreeable for multiple close-up images of the eye of the subject to be obtained as specified in step 12. In such cases, it is possible to simulate the capture of multiple images at different focus settings. The only required input image is a single sharply focused image of the subject's eye having resolution of at least 130 pixels across the diameter of the iris. A range of images with various degrees of defocus, representative of the results of a range of focus settings in the actual imaging system, may be produced from the single input image by digitally effecting low-pass spatial filtering of the input images using neighboring averaging (see *Digital Image Processing,* R. C. Gonzalez and R. E. Woods, Addison-Wesley, 1992). The energy causing the image of a given pixel in the sharply focused input image is spread evenly over a circular neighborhood in a defocused image. The radius of this neighborhood increases with the degree of defocus. (See section 4.3 of "Real-Time Focus Range Sensor" by S. K. Nayar, M. Watanabe, and M. Noguchi in the Proceedings of the International Conference on Computer Vision, June 1995, pp. 995–1001.) Thus neighborhood averaging with circular neighborhoods may be used to generate defocused images from a single sharply focused image.

Because of the equivalence of defocusing with a specific kind of low-pass spatial filtering, it is evident that the most sharply focused image of an eye contains the most information about the details of the texture of the iris, and thus about the identity of the subject. But various imperfections in real video capture facilities, especially some degree of defocus, generally cause the loss of high-frequency detail in captured images. The preferred embodiment of FIG. 1 may be viewed as a method of filtering some high-frequency detail from the most sharply focused image of a subject's eye, which sacrifices some small amount of information about his identity, in order that the result, the master enroll image, better represents the distribution of randomly varying images expected from real video capture facilities. As the imperfections in video capture facilities used for iris identification are reduced, the master enroll image will move closer in Hamming distance and spatial frequency content to a sharply focused image of the subject's eye.

Figure 2:
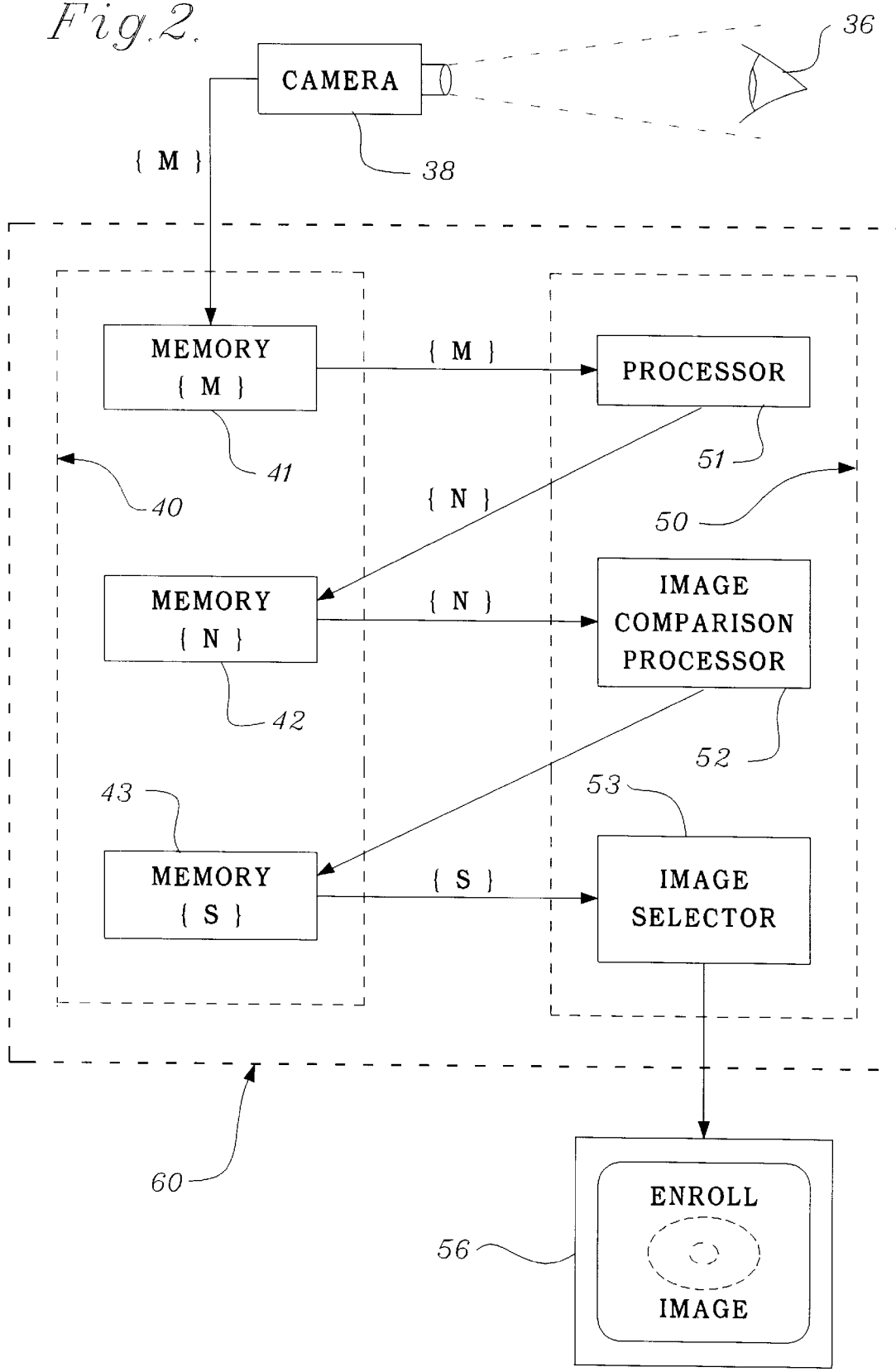
FIG. 2 is a block diagram of a present preferred apparatus for selecting a master enroll image.

My method can be practiced using a camera connected to a computer which has sufficient processing capability and memory to perform the method. Referring to FIG. 2, I provide a camera 28 which creates a set of digitized images of a subject's eye 36. This camera preferably is a CMOS imager. The set of images M is transmitted to a first memory 41. A processor 51 retrieves set M and selects from that set a second set of images, set N, which all have a focus value within a predetermined range. That set N is stored in memory 42. A second processor 52, identified as an image comparison processor in the drawing, retrieves the images of set N from memory. That image comparison processor compares each image within set N to all other images in that set and creates a third set S. Set S contains those images in set N which have a predetermined number of successful matches to the other images in set N. Set S is stored in memory 43. A third processor 53 selects the master enroll image 56 from set S. As indicated by the dotted line box 40 each of the memories 41, 42 and 43 may be a single memory device that may contain other information. Similarly a single processing device 50 can be used for processor 51, image comparison processor 52 and image selector 53. The memory 40 and processor 50 preferably are contained within a computer indicated by dotted line box 60.

Although my method is particularly useful for iris identification, it is applicable to other situations involving image matching to identify a subject in one image by comparing it to a previously stored image, here called the enrollment image. For example, the image may contain other biometric features of an individual such as a fingerprint, hand print or full facial image. The method could also be used to identify products by symbols on their packages which are more complex than simple bar codes. The method could also be used to select a master image against which products are compared to assure quality. The features being assessed for quality control purposes may range from dimensions, to print quality, to orientation of labels on a package.

The images may be produced using any type of imaging device and lighting. For some applications illumination with visible light may be selected, while infrared, ultraviolet, or X-ray imaging may be used for other situations. I have found infrared illumination of nominally 880 nm. to be preferrable for iris identification because this type of light easily passes through sunglasses. Whatever illumination system is used to take images of a subject to be identified, the illuminators need not be changed to practice the present invention. Indeed, I prefer to create the enrollment image using the same illumination that will be used to capture the images to be compared to the enrollment image.

Although I have shown and described certain present preferred embodiments of our method it should be understood that our invention is not limited thereto but may be variously embodied within the scope of the following claims.

I claim:

1. A method of selecting a master enroll image against which other images will be compared using image matching techniques to identify a subject in the image, the master enroll image being selected from a plurality of images wherein each of said plurality of images is formed of pixels, the method comprising the steps of:

a) collecting a first set M of images of a subject, said first set M of images being collected at different focus settings;

b) computing a focus value F of each image in said first set M, and selecting a second set N of images having a focus value within a selected range;

c) comparing each image in the second set N of images with all of the other images in the second set N to determine if a match is found between that image and each other image in the second set N using the image matching techniques;

d) for each image in set N recording how many successful matches were made;

e) forming a third set S of images which is comprised of those images from set N having at least a predetermined number of successful matches; and f) selecting the master enroll image from said third set S of images.

2. The method of claim 1 wherein step e) further comprises:
   a) if said third set S of images has one member, selecting that image as the master enroll image; and
   b) if said third set S of images has more than one member, selecting an enrollment image from the third set S based upon a selected feature of that image.

3. The method of claim 2 wherein the images are images of the human eye and a quality of the image is accessed using the Hamming distance associated with an iris code comparison.

4. The method of claim 3 wherein the selected feature is a median Hamming distance for each selected image in said third set S of images, and the master enroll image is selected as the image generating a comparison with the smallest median Hamming distance.

5. The method of claim 1 also comprising determining if any images have successfully matched at least 90% of the other images and if so selecting the enrollment image from such images and if not repeating steps a through f.

6. The method of claim 1 wherein each image in the first set M of images contains a person's iris.

7. The method of claim 1 wherein the subject is at least a portion of an exterior of a package.

8. The method of claim 1 wherein each image contains a biometric feature of a human.

9. The method of claim 8 wherein the biometric feature is a fingerprint.

10. The method of claim 1 wherein at least some members of set M are created by producing subsequent images from a first image by digitally processing the first image to change focus of the first image thereby producing at least one subsequent image.

11. The method of claim 1 wherein the selected range for the focus value F is $0.30<F<0.60$.

12. The method of claim 1 wherein the focus value F of step b is replaced by some other metric selected from the sets of metrics consisting of rotation of image and number of gray scales.

13. The method of claim 1 wherein the images are infrared images.

14. An apparatus for selecting a master enroll image against which other images will be compared using matching techniques to identify a subject in the image comprising:
   a) at least one memory containing a first set M of images of a subject, said first set M of images having been collected at different focus settings, a second set of images N and a third set of images S;
   b) at least one processor connected to the at least one memory the at least one processor being able to compute a focus value F of each image in said first set M, select a second set N of images having a focus value within a selected range, compare each image in the second set N of images with all of the other images in the second set N to determine if a match is found between that image and each other image in the second set N using the image matching techniques, record for each image in set N how many successful matches were made, form a third set S of images which is comprised of those images from set N having at least a predetermined number of successful matches, and select the master enroll image from said third set S of images.

15. The apparatus of claim 14 also comprising at least one imager which creates the first set of images and is connected to the at least one memory.

16. The apparatus of claim 15 wherein the imager is a camera.

17. The apparatus of claim 15 wherein the imager is a CMOS device.

18. The apparatus of claim 14 wherein the apparatus is contained within a computer.

19. The apparatus of claim 14 wherein the images are infrared images.

* * * * *